United States Patent

Hirakawa et al.

[11] Patent Number: 5,447,579
[45] Date of Patent: Sep. 5, 1995

[54] ROLLING PART STEEL

[75] Inventors: Kiyoshi Hirakawa; Norifumi Ikeda, both of Kanagawa, Japan

[73] Assignee: NSK Ltd., Tokyo, Japan

[21] Appl. No.: 164,840

[22] Filed: Dec. 9, 1993

Related U.S. Application Data

[63] Continuation of Ser. No. 847,402, Mar. 6, 1992, abandoned.

[30] Foreign Application Priority Data

Mar. 8, 1991 [JP] Japan .................................. 3-043371

[51] Int. Cl.$^6$ .............................................. C22C 38/00
[52] U.S. Cl. ...................................... 148/320; 148/906; 148/333; 384/492
[58] Field of Search .................. 148/320, 906, 333; 384/492, 912

[56] References Cited

U.S. PATENT DOCUMENTS

| | | | |
|---|---|---|---|
| 4,042,381 | 8/1977 | Thomas et al. | 420/84 |
| 4,255,188 | 3/1981 | Riekels | 420/84 |
| 4,279,646 | 7/1981 | Kato et al. | 420/84 |
| 4,642,219 | 2/1987 | Takata et al. | 148/333 |
| 4,806,304 | 2/1989 | Kimura et al. | 420/84 |
| 5,030,017 | 7/1991 | Murakami et al. | 384/492 |

FOREIGN PATENT DOCUMENTS

| | | |
|---|---|---|
| 54-126622 | 10/1979 | Japan . |
| 2125838 | 5/1990 | Japan . |
| 2125841 | 5/1990 | Japan . |
| 2209452 | 8/1990 | Japan . |

*Primary Examiner*—Deborah Yee
*Attorney, Agent, or Firm*—Sughrue, Mion, Zinn, Macpeak & Seas

[57] ABSTRACT

A rolling part steel with which the strength of a rolling part of a cold-worked bearing is improved compared with that of a conventional turned part by controlling the length and number of sulfide inclusions in the steel to an optimal range, when a rolling part steel is prepared so that the maximum length of sulfide inclusions in the steel is 100 μm or less and that a number of sulfide inclusions whose lengths exceed 40 μm is 50 or less per unit area (160 mm$^2$), the roughness of its bore surface is improved to have a greater strength. As a result, for example, a thus formed raceway ring has a longer life against fatigue-induced cracks than a turned raceway ring.

6 Claims, 2 Drawing Sheets

ROLLING PART STEEL

This is a continuation of application No. 07/847,402 filed Mar. 6, 1992, now abandoned.

BACKGROUND OF THE INVENTION

1. Field of the Invention

The invention relates to a steel suitably utilized in a rolling part such as a raceway ring and a rolling body of a roll bearing used in automobiles and various machines. More particularly, it is directed to an improvement in the strength of the steel when the steel is cold worked.

2. Description of the Related Art

A rolling part of a roll bearing is usually formed by following the steps of plastic-working, turning, heat-treating, grinding, and surface-finishing a bearing steel. If the steel is, e.g., a high carbon chromium bearing steel (hereinafter referred to as "bearing steel") which is often used as a general-purpose bearing steel, the heat treatments used for it are quenching and tempering. Further, if the steel is, e.g., a case hardened bearing steel used as a carburized bearing steel (hereinafter referred to as "carburized steel"), then the heat treatments used for it are carburizing, quenching, and tempering.

On the other hand, a rolling part, such as a raceway ring, is fabricated by cold working the bearing steel or the carburized steel to skip the turning process, and heat treating it thereafter.

By the way, since a rolling part of a roll bearing is subjected to repeated stress under a high surface pressure, flaking due to rolling contact fatigue comes to appear on the raceway surface or on the rolling surface in due course. As causes of a reduction in the total number of rotations that induces damage on the material by the rolling contact fatigue, i.e., a reduction in the life against the rolling contact fatigue (hereinafter referred to as "rolling life" or simply as "life") the following are known.

(1) Flaking is caused by microcracks that are disseminated with a damage as a starting point, the damage being caused on the surface of a bearing by foreign matter such as chips, shavings, burs, abrasion powder improperly introduced into a bearing lubricant.

(2) Nonmetallic inclusions are present in the base material of the bearing steel and they serve as a source for stress concentration due to their hardness being high and their plastic deformability being low. As a result, they hamper the effect of alleviating the stress concentration to decrease the life against the rolling contact fatigue.

The applicant studied in various ways the extension of the life of the roll bearing steel and the control of incidence of cracks during its pre-working process such as forging involving a high working rate in the fabrication of a bearing, obtained some findings on the relationship between the amount of retained austenite and the life as well as the relationship between the sulfur content and the crack incidence during the pre-working process, etc., and disclosed an invention based on these findings in Japanese Patent Unexamined Publication No. 125841/1990. According to the disclosure, sulfur becomes the source for generating sulfide nonmetallic inclusions such as MnS, and the generated MnS acts as an origin for causing cracks during a bearing part pre-working process such as forging and rolling. To overcome this problem, medium carbon manganese steel whose sulfur content is 80 ppm or less was used and the amount of retained austenite was set to 25 to 45 vol. % on a surface portion of the bearing part after carburizing or carbonitriding heat treatment, and as a result, a roll bearing which can enjoy a long life even under a lubrication having foreign matters, which can prevent generation of cracks during its pre-working process such as forging, and which can improve its working rate could be provided.

Further, the applicant could successfully improve the life of the bearing even if its plastic working rate was made higher by using an alloy steel having a carbon content of 0.3 to 0.6 wt. %, a chromium content of 3 to 14 wt. %, and a sulfur content of 80 ppm or less, heat treating it after carburizing or carbonitriding, improving its surface hardness while controlling the amount of fine carbides in the surface portion to 20 to 50 vol. %, and controlling the amount of retained austenite in the surface portion to 10 to 25 vol. % to thereby obviate incidence of microcracks under the lubrication having foreign matters (see U.S. Pat. No. 5,030,017).

As described above, it was certainly effective to control the S content in the steel to 80 ppm or less to prevent pre-working cracks for the rolling part, whose rolling life was improved. However, it was impossible to completely eliminate the MnS-attributed cracks by merely regulating the S content as in the conventional way. Even if no cracks are identified at all from observation by naked eyes or a stereoscopic microscope, reduction in the strength is found on the worked rolling part. Particularly, when a rolling part such as a raceway ring is cold-worked by skipping the turning process, reduction in the ring rotating fatigue life against fatigue-induced cracks is further promoted than a turned part.

SUMMARY OF THE INVENTION

Accordingly, an object of the invention is to provide a rolling part steel with which the ring rotating fatigue life against fatigue-induced cracks of a rolling part of a cold-worked bearing can be improved compared with that of a conventional turned part by controlling the length and number of sulfide inclusions in the steel within optimal ranges based on the forging ratio corresponding to the S content.

The invention is characterized in that the maximum length of sulfide inclusions in a rolling part steel is controlled to 100 $\mu$m or less and that the number of sulfide inclusions whose lengths exceed 40 $\mu$m is controlled to 50 or less per unit area (160 mm$^2$).

When the length and number of sulfide inclusions in the rolling part steel are controlled within the above-mentioned ranges, the ring rotating fatigue life against fatigue-induced cracks (hereinafter referred to as "life") of a cold-worked rolling part can be extended compared with that of a conventional turned part. According to the results of the tests conducted by the inventors, it is found out that the negative effect of the sulfide inclusions on the reduction in the life of, e.g., a raceway ring, which is a rolling part of a roll bearing, is extremely noticeable when the maximum length of such inclusions exceeds 100 $\mu$m. Hence, by controlling the maximum length of the sulfide inclusions to 100 $\mu$m or less, the life of the raceway ring can be extended. Further, it is found out that when the number of sulfide inclusions whose lengths exceed 40 $\mu$m but are below the maximum length of 100 $\mu$m is controlled to 50 or less per 160 mm$^2$, the roughness of the cold-worked bore surface is so improved that its strength can be improved greatly with a longer life provided compared with a turned raceway ring.

On the other hand, with respect to the sulfide inclusions whose maximum length is 40 μm or less, it is verified that no reduction in the life is observed independently of its number.

The invention has been made based on the above findings, and provides the advantage of improving the life of a cold-forged rolling part of a bearing compared with the life of a conventional turned part by controlling the length and number of sulfide inclusions in a bearing steel for fabricating rolling parts within optimal ranges.

DETAILED DESCRIPTION OF THE PREFERRED EMBODIMENT

An embodiment of the invention will now be described.

Figure 1:
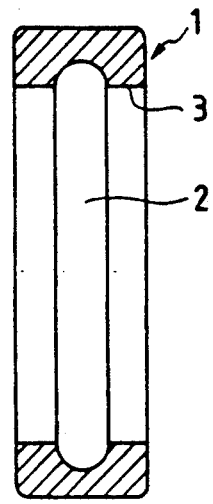
FIG. 1 is a longitudinal sectional view of a rolling part of a bearing used in an embodiment of the invention.

As test pieces, steels having such chemical compositions as shown in Table 1 were prepared by changing the sulfur content and the forging ratio (the cross-section after rolling/the cross section before rolling) of a bearing steel SUJ2 and a carburized steel SCr420, respectively. Then, cylindrical blanks were formed by turning from the respective steels, and outer rings 1, which are rolling parts of radial deep groove ball bearings (baring series BAS608) such as shown in FIG. 1 were thereafter prepared from the blanks by cold rolling. As comparative pieces, similar outer rings were formed by turning using the same steels. These test pieces and comparative pieces were quenched at 840° C. for 20 minutes and then tempered at 170° C. for 90 minutes to obtain the HRC hardness of 62 to 62.5 for the steel SUJ2 and the HRC hardness of 46 to 47 for the steel SCr420, and finally finished into the raceway groove 2, a flat surface 3, and an outside diameter surface 4 by grinding.

Figure 2:
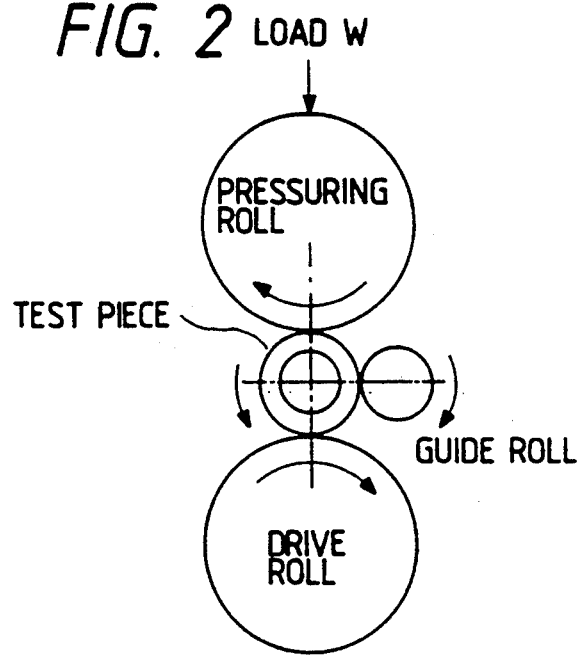
FIG. 2 is a diagram illustrative of a ring totating fatigue test machine for the rolling part of the bearing used in the embodiment of the invention.

These test pieces and comparative pieces are attached to a ring rotating fatigue test machine as shown in FIG. 2 to subject them to a repeated bending fatigue Strength test. A load of 120 Kgf was applied to the SUJZ pieces, while a load of 100 Kgf was applied to the SCr420 pieces, with the number of rotations of each test piece and each comparative piece was 9600 rpm. The reason why the carburized steel SCr420 was not carburized is to remove influence of a carburizing and quenching-induced compression residual stress upon improvement of the fatigue strength and thereby allow changes in the strength caused by cold rolling to be identified.

Further, prior to the above repeated ring rotating fatigue test, the maximum length of sulfide inclusions at sampling positions on the respective blanks of the steels and their number per 160 $mm^2$ were measured using an image analyzer.

Table 1 shows the forging ratios between the test pieces and the comparative pieces and the measurement results of the length and number of sulfide inclusions, with the additional indication of the results of their life tests $L_{10}$ conducted by the ring rotating fatigue test machine.

[TABLE 1]

| Class | Method of Working | Sample No. | Chemical Compositin (wt %) | | | | | | Forging Ratio | Number of Sulfide Inclusions (piece/16 $mm^2$) | | | Ring Fatigue Life $L_{10}$ ($\times 10^5$) | Remarks |
|---|---|---|---|---|---|---|---|---|---|---|---|---|---|---|
| | | | C | Si | Mn | P | S | Cr | $O_2$ | | 40 μm or less | over 40 μm and 100 μm or less | over 100 μm | | |
| Bearing Steel | Cold rolling | A-1 | 0.97 | 0.23 | 0.31 | 0.014 | 0.001 | 1.41 | 8 | 10 | 24 | 3 | 0 | 25.1 | test load of 120 kgf |
| | | A-2 | " | " | " | " | " | " | " | 30 | 18 | 6 | 0 | 26.8 | test load of 120 kgf |
| | | A-3 | " | " | " | " | " | " | " | 60 | 15 | 10 | 0 | 23.5 | test load of 120 kgf |
| | | A-4 | 0.98 | 0.23 | 0.29 | 0.012 | 0.002 | 1.44 | 8 | 10 | 75 | 16 | 0 | 20.8 | test load of 120 kgf |
| | | A-5 | " | " | " | " | " | " | " | 30 | 51 | 32 | 0 | 19.1 | test load of 120 kgf |
| | | A-6 | " | " | " | " | " | " | " | 60 | 32 | 64 | 0 | 12.5 | test load of 120 kgf |
| | | A-7 | 0.96 | 0.17 | 0.31 | 0.019 | 0.001 | 1.34 | 9 | 10 | 157 | 25 | 0 | 18.7 | test load of 120 kgf |
| | | A-8 | " | " | " | " | " | " | " | 30 | 110 | 60 | 0 | 9.5 | test load of 120 kgf |

[TABLE 1]-continued

| Class | Method of Working | Sample No. | Chemical Composition (wt %) | | | | | | Forging Ratio | Number of Sulfide Inclusions (piece/16 mm$^2$) | | | Ring Fatigue Life $L_{10}$ (×10$^5$) | Remarks |
|---|---|---|---|---|---|---|---|---|---|---|---|---|---|---|
| | | | C | Si | Mn | P | S | Cr | O$_2$ | | 40 μm or less | over 40 μm and 100 μm or less | over 100 μm | | |
| | | A-9 | " | " | " | " | " | " | " | 60 | 92 | 85 | 12 | 5.6 | test load of 120 kgf |
| | | A-10 | 0.98 | 0.21 | 0.36 | 0.015 | 0.006 | 1.35 | 6 | 10 | 271 | 52 | 0 | 17.5 | test load of 120 kgf |
| | | A-11 | " | " | " | " | " | " | " | 30 | 220 | 110 | 18 | 8.4 | test load of 120 kgf |
| | | A-12 | " | " | " | " | " | " | " | 60 | 134 | 186 | 27 | 4.7 | test load of 120 kgf |
| | Turning | B-1 | 0.97 | 0.23 | 0.31 | 0.011 | 0.001 | 1.41 | 8 | 30 | 18 | 6 | 0 | 21.5 | test load of 120 kgf |
| | | B-2 | 0.98 | 0.23 | 0.29 | 0.012 | 0.002 | 1.44 | 8 | 10 | 75 | 16 | 0 | 17.8 | test load of 120 kgf |
| | | B-3 | 0.96 | 0.17 | 0.31 | 0.019 | 0.001 | 1.34 | 9 | 30 | 110 | 68 | 0 | 16.2 | test load of 120 kgf |
| | | B-4 | 0.98 | 0.21 | 0.36 | 0.015 | 0.006 | 1.35 | 6 | 60 | 134 | 186 | 27 | 15.1 | test load of 120 kgf |
| Carburized steel | Cold Rolling | C-1 | 0.21 | 0.25 | 0.78 | 0.017 | 0.005 | 1.12 | 12 | 10 | 178 | 33 | 0 | 14.2 | test load of 100 kgf |
| | | C-2 | " | " | " | " | " | " | " | 30 | 145 | 65 | 2 | 8.5 | test load of 100 kgf |
| | | C-3 | " | " | " | " | " | " | " | 60 | 112 | 97 | 17 | 2.7 | test load of 100 kgf |
| | Turning | D-1 | " | " | " | " | " | " | " | 30 | 145 | 65 | 2 | 10.8 | test load of 100 kgf |

Figure 3:
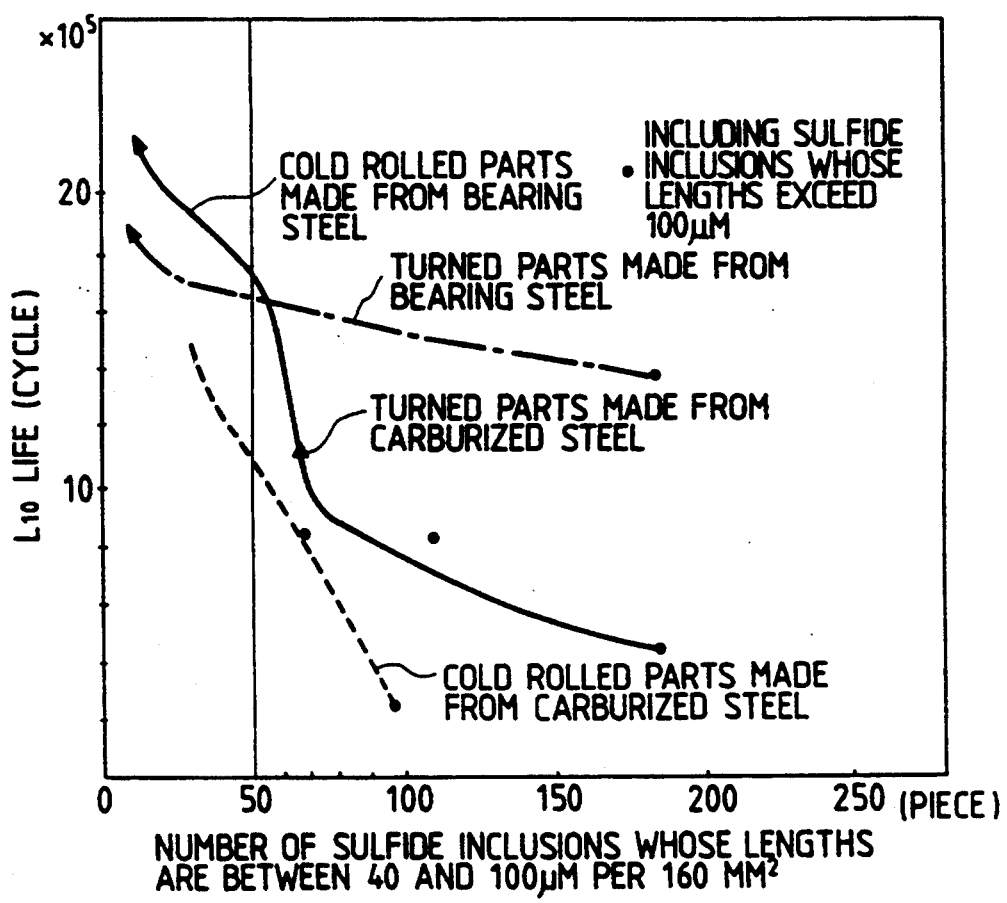
FIG. 3 is a graph showing a relationship between the number of sulfide inclusions whose lengths exceed 40 μm and the life of the rolling part of the bearing.

FIG. 3 shows a relationship between the number of sulfide inclusions whose lengths are between 40 to 100 μm and the life plotted from the results shown in Table 1. FIG. 3 presents a tendency that the number of sulfide inclusions whose lengths are within the above-mentioned range increases and that the life decreases in both the bearing steel and the carburized steel. It is understood that particularly cold-rolled parts exhibit such tendency noticeably. With respect to the cold-rolled parts made from the bearing steel, when the number of sulfide inclusions whose lengths fall within the above-mentioned range exceeds 50/160 mm$^2$, their lives fall below those of turned parts made from the bearing steel, with a further sharp drop. As long as the number of sulfide inclusions is 50/160 mm$^2$ or less, the lives of the cold-rolled parts are definitely longer than those of the turned parts. Also, with respect to the carburized steel, it is when the number of sulfide inclusions is 50/160 mm$^2$ or less that the lives of the cold-rolled parts are longer than those of the turned parts. Therefore, to obtain the cold-rolled parts whose lives are longer than those of the turned parts, it is apparent that the limiting of the number of sulfide inclusions whose lengths exceed 40 μm in a rolling part steel to 50/160 mm$^2$ has a meaning as a critical range.

Further, as plotted by the solid dot in FIG. 3, it is apparent that the presence of the sulfide inclusions whose lengths exceed 100 μm decreases the life.

Figure 4:
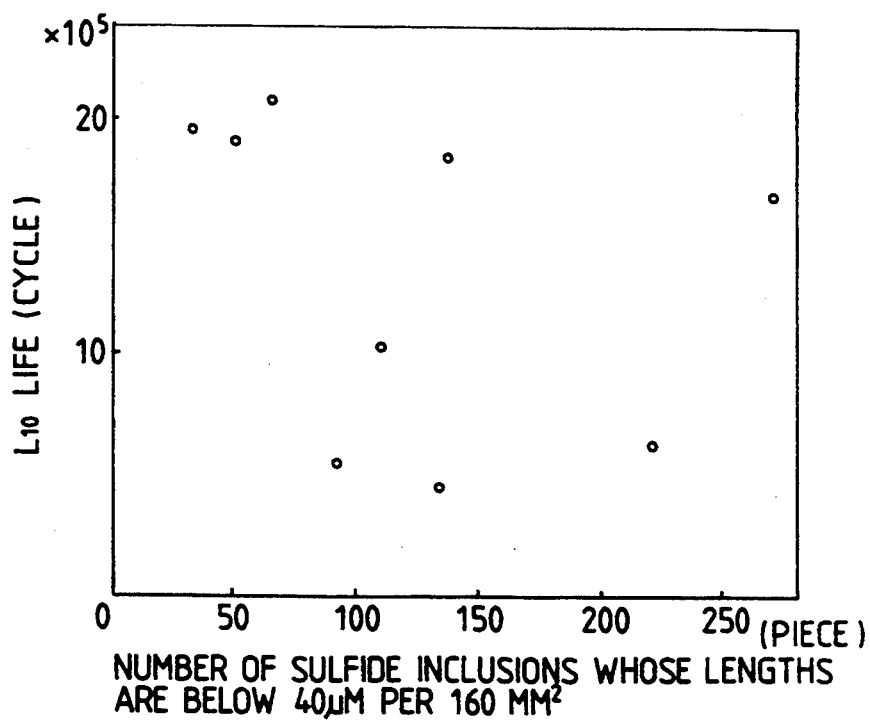
FIG. 4 is a graph showing a relationship between the number of sulfide inclusions whose lengths exceed 40 μm and the life of the rolling part of the bearing.

FIG. 4 plots the relationship between the number of the same sulfide inclusions whose lengths are 40 μm or less and the life. From FIG. 4, there is no correlation observed between them, and the sulfide inclusions whose lengths are up to 40 μm do not contribute to decreasing the life.

Figure 5:
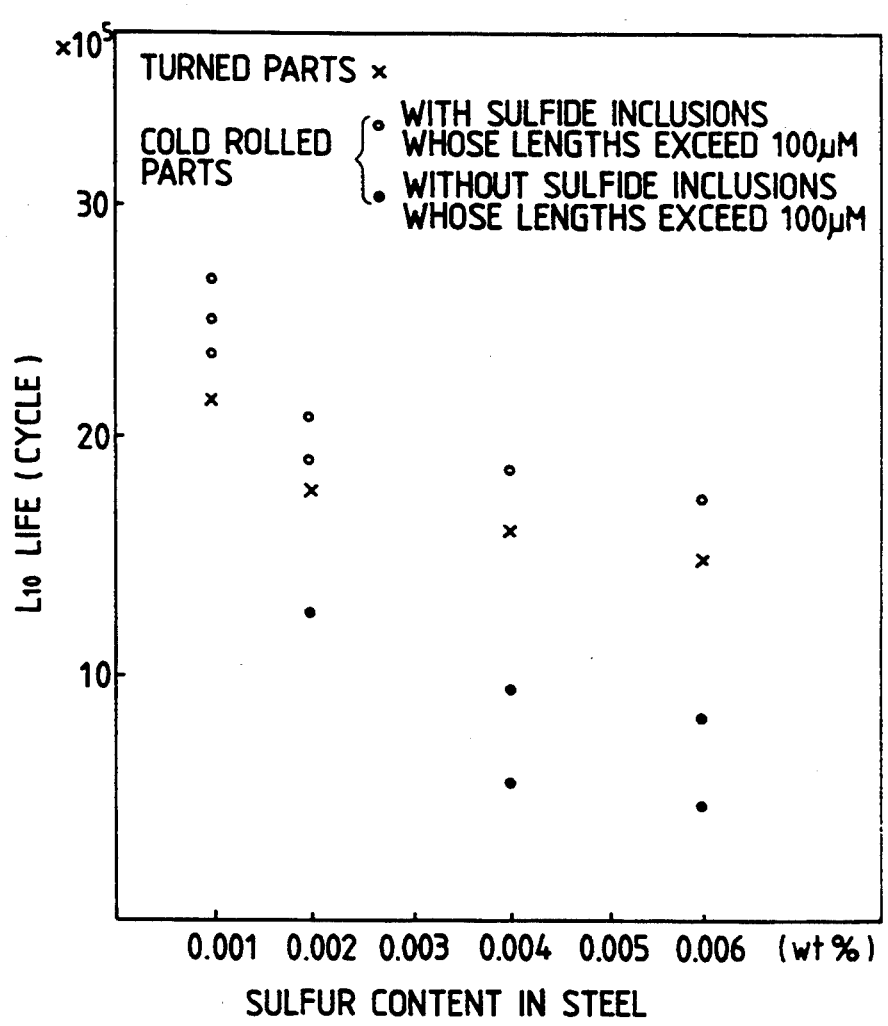
FIG. 5 is a graph showing a relationship between the sulphur content and the life of the rolling part of the bearing.

FIG. 5 plots a relationship between the sulfur content (in wt. %) and the life with respect to samples made from a bearing steel. It is understood from FIG. 5 that the lives of the rolling parts with no presence of sulfide inclusions whose lengths exceed 100 μm are longer than those of the turned parts having the same sulfur content, while that the presence of sulfide inclusions whose lengths exceed 100 μm makes the lives of the rolled parts shorter than those of the turned parts irrespective of the sulfur content, with respect to the samples, the sulfur contents of which are: 0.001, 0.002, 0.004, and 0.006 wt. %. Further, the life tends to decrease with increasing sulfur content, and it can be said from this that a smaller sulfur content is better. However, it is desirable to set the maximum sulfur content to 0.001 wt. % to particularly ensure the life that is surely longer than that of the turned part.

As is apparent from Table 1, the number of sulfide inclusions whose lengths exceed 40 μm, which is the length affecting the life of the rolled part, increases with increasing forging ratio and with increasing sulfur content. In other words, the length and number of sulfide inclusions in the rolled part can be controlled by both the sulfur content and the forging ratio. As a result, the life of cold-rolled bearing part can be made longer than that of the conventional turned part.

As described in the foregoing pages, according to the invention, the maximum length of sulfide inclusions in a rolling part steel is controlled to 100 μm or less and the number of sulfide inclusions whose lengths exceed 40 μm is controlled to 50 or less per unit area (160 mm²). Therefore, the roughness of the cold-worked bore surface is improved to increase its mechanical strength, thereby providing the advantage of improving the life against fatigue-induced cracks of the rolling part of the bearing made from the steel by cold working compared with that of the part fabricated from the steel by turning.

The foregoing description of preferred embodiments of the invention has been presented for purposes of illustration and description. It is not intended to be exhaustive or to limit the invention to the precise form disclosed, and modifications and variations are possible in-light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A rolling part steel wherein the maximum length of sulfide inclusions thereof is 100 μm or less and the number of sulfide inclusions with lengths exceeding 40 μm is 50 or less per unit area of 160 mm²,
   wherein the S content in the steel is controlled to 10 ppm or less.

2. A rolling part comprising steel wherein the maximum length of sulfide inclusions thereof is 100 μm or less and the number of sulfide inclusions with lengths exceeding 40 μm is 50 or less per unit area of 160 mm² wherein the S content in said steel is controlled to 10 ppm or less, and wherein said steel is subjected to a plastic working so as to form said steel into a predetermined configuration.

3. A rolling bearing comprising:
   races; and
   a rolling element;
   wherein at least one of said races is made of a steel wherein the maximum length of sulfide inclusions thereof is 100 μm or less and the number of sulfide inclusions with lengths exceeding 40 μm is 50 or less per unit area of 160 mm²,
   wherein the S content in the steel is controlled to 10 ppm or less.

4. A rolling bearing according to claim 3, wherein said steel is subjected to a plastic working so as to form said steel into a predetermined configuration.

5. A rolling part, wherein said rolling part is made of a steel wherein the maximum length of sulfide inclusions thereof is 100 μm or less and the number of sulfide inclusions with lengths exceeding 40 μm is 50 or less per unit area of 160 mm²,
   wherein the S content in the steel is controlled to 10 ppm or less.

6. A rolling part according to claim 5, wherein said steel is subjected to a plastic working so as to form said steel into a predetermined configuration.

* * * * *